United States Patent
Wu et al.

(10) Patent No.: US 9,906,177 B2
(45) Date of Patent: Feb. 27, 2018

(54) LOW-FREQUENCY BAND SUPPRESSION ENHANCED ANTI-REVERSAL POWER SYSTEM STABILIZER

(71) Applicants: State Grid Zhejiang Electric Power Research Institute, Hangzhou, Zhejiang (CN); STATE GRID Corporation of China, Beijing (CN); NR Electric Co., Ltd, Nanjing, Jiangsu (CN)

(72) Inventors: Kuayu Wu, Zhejiang (CN); Cencen Lu, Zhejiang (CN); Long Wu, Zhejiang (CN); Xiaoming Huang, Zhejiang (CN); Chengyu Lu, Zhejiang (CN); Boliang Lou, Zhejiang (CN); Bing Han, Zhejiang (CN); Jiahua Lu, Zhejiang (CN); Hongtao Xiong, Zhejiang (CN); Yijun Shen, Zhejiang (CN); Haiqing Lu, Zhejiang (CN)

(73) Assignees: STATE GRID ZHEJIANG ELECTRIC POWER RESEARCH INSTITUTE, Hangzhou, Zhejiang (CN); STATE GRID CORPORATION OF CHINA, Beijing (CN); NR ELECTRIC CO., LTD, Nanjing, Jiangsu (CN)

( * ) Notice: Subject to any disclaimer, the term of this patent is extended or adjusted under 35 U.S.C. 154(b) by 0 days.

(21) Appl. No.: 15/097,691

(22) Filed: Apr. 13, 2016

(65) Prior Publication Data

US 2017/0025978 A1 Jan. 26, 2017

(30) Foreign Application Priority Data

May 7, 2015 (CN) .......................... 2015 1 0229641

(51) Int. Cl.
*H02P 11/00* (2006.01)
*H02H 7/06* (2006.01)
(Continued)

(52) U.S. Cl.
CPC .................................... *H02P 9/102* (2013.01)

(58) Field of Classification Search
USPC ................. 322/19; 290/44; 324/322; 330/52
See application file for complete search history.

(56) References Cited

U.S. PATENT DOCUMENTS 5,307,022 A * 4/1994 Tattersall, Jr. ........ H03F 1/3235
    330/151
5,473,666 A * 12/1995 Szczebak, Jr. .......... H04M 3/22
    375/345

(Continued)

*Primary Examiner* — Pedro J Cuevas
(74) *Attorney, Agent, or Firm* — Global IP Services; Tianhua Gu (57) ABSTRACT

A low-frequency band suppression enhanced anti-reversal power system stabilizer is presented by the invention. Currently the widely used PSS2B power system stabilizer needs lead elements above Order 2 to meet the phase compensation requirement of DC blocking signal of active power, thus quickly increasing high-frequency band gain, restricting allowable total setting gain of PSS, limiting low-band gain and reducing low-frequency band suppression ability of power system stabilizer. The invention will add generator speed signal ω (which is treated by DC blocking element and corrected by parallel proportional differential PD) and active power signal $P_e$ (which is treated by DC blocking element and gained by gain factor $K_{s3}$) to get equivalent synthetic mechanical power of power system stabilizer. The actual active power signal gained by gain factor $K_{S1}$ can meet the requirement of phase compensation through Order 1 lead and lag elements, thus increasing allowable total setting gain of PSS and improving the ability of low-frequency band oscillation suppression.

6 Claims, 4 Drawing Sheets

(51) Int. Cl.
*H02P 9/00* (2006.01)
*H02P 9/10* (2006.01)
*F03D 9/00* (2016.01)
*H02P 9/04* (2006.01)

(56) References Cited

U.S. PATENT DOCUMENTS

| | | | | |
|---|---|---|---|---|
| 5,489,875 A * | 2/1996 | Cavers | ............... | H03F 1/3229 330/149 |
| 5,528,196 A * | 6/1996 | Baskin | ............... | H03F 1/3235 330/151 |
| 5,565,814 A * | 10/1996 | Fukuchi | ............... | H03F 1/3235 330/151 |
| 5,640,433 A * | 6/1997 | Szczebak, Jr. | ............... | H04M 3/22 375/220 |
| 5,652,712 A * | 7/1997 | Szczebak, Jr. | ............... | H04M 3/22 324/601 |
| 5,768,699 A * | 6/1998 | Behan | ............... | H03F 1/3235 330/151 |
| 5,977,825 A * | 11/1999 | Mueck | ............... | H03F 1/3229 330/149 |
| 6,081,156 A * | 6/2000 | Choi | ............... | H03F 1/3235 330/149 |
| 6,172,488 B1 * | 1/2001 | Mizutani | ............... | H02J 3/1814 323/207 |
| 6,172,560 B1 * | 1/2001 | Yamashita | ............... | H03F 1/3235 330/151 |
| 6,313,702 B1 * | 11/2001 | Seino | ............... | H03F 1/12 330/149 |
| 6,489,844 B2 * | 12/2002 | Yamashita | ............... | H03F 1/3235 330/151 |
| 6,545,885 B2 * | 4/2003 | Nishimura | ............... | H02J 3/01 363/39 |
| 6,791,409 B2 * | 9/2004 | Ishida | ............... | H03F 1/3229 330/149 |
| 7,026,890 B2 * | 4/2006 | Tsutsumi | ............... | H03H 9/0038 333/133 |
| 7,030,716 B2 * | 4/2006 | Tsutsumi | ............... | H03H 9/0038 333/133 |
| 7,064,608 B2 * | 6/2006 | Ascarrunz | ............... | H03F 1/3229 330/149 |
| 7,075,366 B2 * | 7/2006 | Deem | ............... | H03F 1/34 330/149 |
| 7,248,113 B2 * | 7/2007 | Deem | ............... | H03F 1/34 330/149 |
| 7,541,868 B2 * | 6/2009 | Bingham | ............... | H03F 1/3241 330/149 |
| 7,630,794 B2 * | 12/2009 | Mabuchi | ............... | H02J 3/383 700/286 |
| 7,639,015 B2 * | 12/2009 | Thuringer | ............... | G01R 33/3614 324/318 |
| 7,642,666 B2 * | 1/2010 | Ichinose | ............... | F03D 7/0284 290/44 |
| 7,663,348 B2 * | 2/2010 | Oohara | ............... | H02J 3/24 290/44 |
| 7,948,217 B2 * | 5/2011 | Oohara | ............... | H02J 3/24 290/44 |
| 7,952,214 B2 * | 5/2011 | Ichinose | ............... | H02P 9/10 290/44 |
| 8,355,824 B2 * | 1/2013 | Yasugi | ............... | F03D 7/0284 290/44 |
| 8,461,842 B2 * | 6/2013 | Thuringer | ............... | H03F 1/3282 324/318 |
| 9,077,180 B2 * | 7/2015 | Xue | ............... | H02J 3/00 |
| 9,450,411 B2 * | 9/2016 | Chen | ............... | H02J 3/24 |
| 9,606,554 B2 * | 3/2017 | Watanabe | ............... | G05F 1/14 |
| 9,698,722 B2 * | 7/2017 | Loken | ............... | H02P 29/68 |
| 9,735,722 B2 * | 8/2017 | Marohl | ............... | H02P 23/14 |
| 2002/0039299 A1 * | 4/2002 | Nishimura | ............... | H02J 3/01 363/39 |
| 2004/0212452 A1 * | 10/2004 | Tsutsumi | ............... | H03H 9/0038 333/133 |
| 2004/0212453 A1 * | 10/2004 | Tsutsumi | ............... | H03H 9/0038 333/133 |
| 2007/0097565 A1 * | 5/2007 | Oohara | ............... | H02J 3/24 361/20 |
| 2007/0179724 A1 * | 8/2007 | Mabuchi | ............... | H02J 3/383 702/60 |
| 2008/0106099 A1 * | 5/2008 | Ichinose | ............... | F03D 7/0284 290/44 |
| 2008/0296898 A1 * | 12/2008 | Ichinose | ............... | H02P 9/10 290/44 |
| 2010/0102560 A1 * | 4/2010 | Ichinose | ............... | F03D 7/0284 290/44 |
| 2010/0117606 A1 * | 5/2010 | Oohara | ............... | H02J 3/24 322/28 |
| 2011/0074152 A1 * | 3/2011 | Yasugi | ............... | F03D 7/0284 290/44 |
| 2011/0187109 A1 * | 8/2011 | Ichinose | ............... | F03D 7/0284 290/44 |
| 2013/0121046 A1 * | 5/2013 | Xue | ............... | H02J 3/00 363/74 |
| 2013/0257166 A1 * | 10/2013 | Chen | ............... | H02J 3/24 307/102 |
| 2014/0117948 A1 * | 5/2014 | Yasugi | ............... | H02J 3/16 323/208 |
| 2015/0159626 A1 * | 6/2015 | Tarnowski | ............... | F03D 7/028 290/44 |
| 2015/0229251 A1 * | 8/2015 | Stolt | ............... | H02P 29/50 318/400.2 |
| 2015/0270712 A1 * | 9/2015 | Kanayama | ............... | H02J 3/50 307/64 |
| 2015/0286227 A1 * | 10/2015 | Watanabe | ............... | H02J 3/1878 323/340 |
| 2016/0064931 A1 * | 3/2016 | Guo | ............... | H02J 3/12 702/60 |
| 2016/0164444 A1 * | 6/2016 | Wei | ............... | H02M 1/12 322/19 |
| 2016/0262231 A1 * | 9/2016 | Iellina | ............... | H05B 33/0827 |
| 2016/0356171 A1 * | 12/2016 | Thet | ............... | F01D 15/10 |
| 2017/0234299 A1 * | 8/2017 | Kjae Buttedr | ............... | F03D 7/0284 290/44 |
| 2017/0234950 A1 * | 8/2017 | Lenz | ............... | G01R 33/3852 324/322 |

* cited by examiner

LOW-FREQUENCY BAND SUPPRESSION ENHANCED ANTI-REVERSAL POWER SYSTEM STABILIZER

TECHNOLOGICAL FIELD

The invention relates to power system stabilizer for low frequency oscillation suppression in the field of dynamic stability control of power system, which, to be specific, is a power system stabilizer with low-frequency band oscillation suppression capability and anti-reversal function.

BACKGROUND OF THE INVENTION

With rapid progress of robust intelligent power grid, a super-large AC synchronous power grid is gradually shaped up after grids networking in East China, North China and Central China. As backup and supporting system of high capacity DC ultra-high voltage power transmission system, the AC extra-high voltage greatly strengthens interconnection of power systems in different regions. The expansion of AC grid scale results in increase of equivalent inertia of overall power system, thus leading to increasingly low frequency oscillation of the system. In addition, it is inevitable for the remote heavy load AC transmission to cause reduction of system damping and increase of risks in low frequency oscillation and dynamic stability in super-large grids. The power system stabilizer is still the most effective and most economical means to damp low frequency oscillation at present. At the backdrop of super-large AC synchronous grids, PSS is required to cover 0.1 Hz low frequency oscillation suppression.

The current PPS that is most widely used is PSS2B power system stabilizer having good high frequency oscillation suppression, liability to field setting test and anti-reversal suppression.

Figure 1:
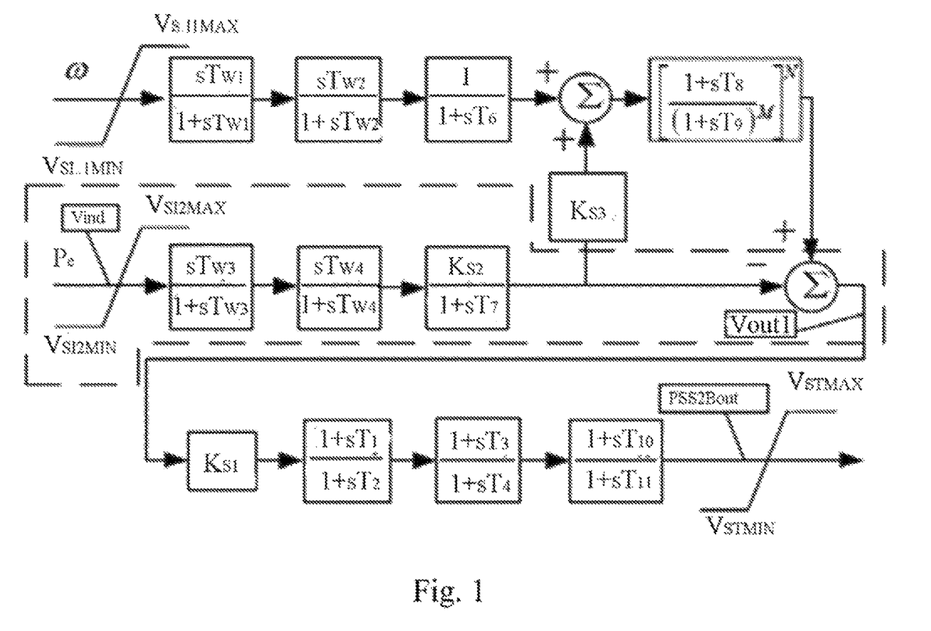
FIG. 1 is the model structure of current PSS2B.

See FIG. 1 for PSS2B model. To form accelerating power by overlapping active power signal $P_e$ and speed signal $\omega$, PSS2B adds Class 1 Order 1 inertial element T7 and gain factor Ks2 after DC blocking element of active power, causing 90° lag of phase characteristic of power fluctuation signal for PSS2B after DC blocking. Since the lag degree caused by Class 1 Order 1 inertial element can meet the requirement of phase compensation by at least Order 2 lead of three lead and lag elements provided by PSS2B, the three-machine brushless excitation even uses three orders of lead compensation to meet the requirements of phase compensation specified by relevant standards in 0.1-2 Hz full band. Capable of well fulfilling phase compensation in 0.1-2 Hz band, Multi-order lead compensation will cause sharp increase of high-band gain, thus limiting amplification factor $K_{S1}$ of PSS2B actual setting. Limiting of PSS2B high-band gain results in insufficient low-band gain, which severely weakens its oscillation suppression ability in intermediate and low frequency.

Figure 2:
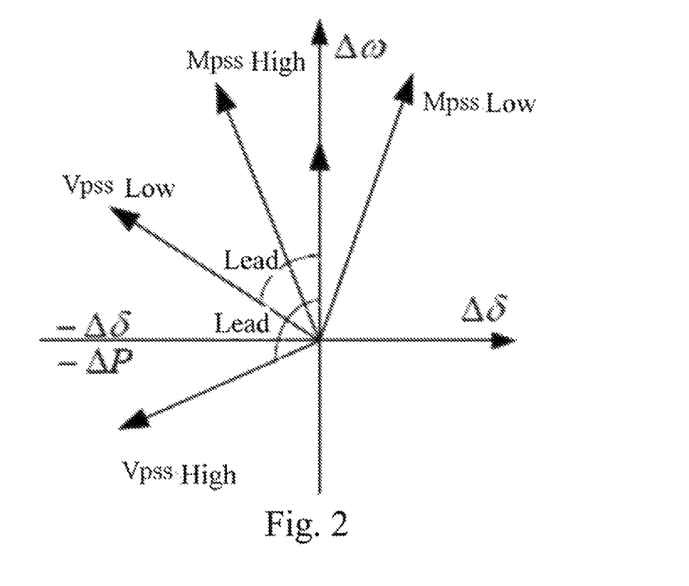
FIG. 2 is the phase relation between phase compensation and input signal of current PSS2B. $V_{pss\ low}$, $V_{pss\ high}$, $M_{pss\ high}$ and $M_{pss\ low}$ mean output in low frequency band, output in high frequency band, moment in high frequency band and moment in low frequency band of PSS2B respectively.

See FIG. 2 for phase relation between existing PSS2B phase compensation and input signal. The input signal of PSS2B phase compensation element Vout1 approximates to speed signal $\Delta\omega$, so anti-reversal is suppressed by compensating active signal (which enables change of mechanical power) and speed signal. The lag of uncompensated lag characteristic phase of generator measured according to theoretical analysis and engineering is less than 90° in intermediate and low band, but generally above 90° in high band. Both low-band output $V_{pss\ low}$ and high-band output $V_{pss\ high}$ of PSS2B adopt lead compensation. However, the gain of lead element quickly increases along with frequency, directly causing that PSS2B fails to solve harmonious configuration of phase and gain in full band.

Now, the field PSS test is verified by load voltage step, and the disturbance waveform caused is at oscillation frequency point of the machine, only belonging to high band of low oscillation frequency. Therefore, the field step disturbance test shows good oscillation suppression effect of PSS2B, but its low-band oscillation suppression effect is hard to be guaranteed.

On the other hand, currently most of oscillation frequency of AC synchronous grids is in intermediate and high, for example, the possible minimum oscillation frequency of independent East China Power Grid is about 0.5 Hz. Therefore, the problems concerning insufficient suppression in low frequency of PSS2B are not evident. However with formation of extra-high voltage large AC synchronous power grids, the frequency for low frequency oscillation of the system is increasingly low. Sufficient positive damping is required to provide at 0.1-2 Hz of PSS by the industry at present, and the problems of insufficient gain in low-frequency band of PSS2B emerge.

In order to meet the suppression requirement in low-frequency band, the research of multi-band PSS booms in recent years, and various new PSS models have been proposed. However, all have weakness of unclear physical conception and difficult field setting and computation, so they haven't been used in any project.

Currently, the power system stabilizer which has better suppression ability in high and low-frequency bands as well as simple and feasible field setting method with clear physical conception both at home and abroad is in shortage, making super-large power grids have reduced damping level, sufficient suppression ability and dynamic stability problems in low band.

SUMMARY OF THE INVENTION

The technical problem to be settled by the invention is to overcome defects of above technology and to provide a power system stabilizer with equivalent synthetic mechanical power by summing of $\omega$ (referring to generator speed signal which is corrected by DC blocking element and parallel proportional differential PD) and $P_e$ (referring to signal of active power gained by DC blocking element and gain factor $K_{s3}$). The actual fluctuation signal of active power gained by gain factor $K_{S1}$ is able to meet requirement of phase compensation by using Order 1 lead and Order 1 lag elements for solving the PSS2B's problem of severe gain limitation in low-frequency band due to sharp gain increase in high-frequency band after multi-order lead compensation. In addition, use of digital signal processing element of notching filter enables the power system stabilizer having certain suppression for torsional vibration of shaft system.

The invention uses the following technical solution for this purpose, namely low-frequency band suppression enhanced anti-reversal power system stabilizer whose working steps for are shown as follows:

Step 1: Check generator speed single $\omega$. Use two-order DC blocking link to get speed fluctuation signal and then correct it by parallel proportional differential.

Step 2: Check active power signal of generator $P_e$, and use Order 1 or Order 2 DC blocking element to get fluctuation signal of active power.

Step 3: After gain by gain factor $K_{s3}$, the fluctuation signal of active power in Step 2 by is added with speed fluctuation signal corrected by PD in Step 1 together to become equivalent synthetic mechanical power for equaling surplus mechanical power from prime motor.

Step 4: Use notching filter to conduct lowpass filtering for equivalent synthetic mechanical power received in Step 3.

Step 5: Subtract fluctuation signal of active power in Step 2 from signal in Step 4 (by lowpass filtering in notching filter) to get actual fluctuation signal of active power.

Step 6: After gained by gain factor $K_{S1}$, the actual fluctuation signal of active power in Step 5 is taken as output of power system stabilizer after lead and lag correction by Order 1 respectively and upper & lower amplitude limiting.

The invention directly introduces active power signal Pe (which is treated by DC blocking element) to lead lag element, allowing 90° lead of the signal phase by itself after Pe signal is treated by DC blocking element and before entering lead-lag phase correction element. In addition, in order to realize anti-reversal function, $1+T_7s$ element is introduced in ω element, thus ensuring that the summing point of speed ω output and Pe after treated and gained by DC blocking and $K_{s3}$ is able to achieve equivalent synthetic mechanical power. And for ensuring that both speed ω output and Pe after treated and gained by DC blocking and $K_{s3}$ can offset each other in case of change of mechanical power, a $K_W$ gain element is added behind $1+T_7s$ element, therefore the equivalent synthetic mechanical power for field setting is 0. Meanwhile, the notching filter element is reserved to suppress torsional vibration of shaft system. The invention adopts Order 1 lead or Order 1 lag to meet the compensation characteristic phase requirement for generator excitation system, thus avoiding compensation by at least two orders of lead elements for three orders of compensation elements after PSS2B.

Formula of speed fluctuation signal in Step 1 is $$\omega \times \frac{sT_{w1}}{1+sT_{w1}} \times \frac{sT_{w2}}{1+sT_{w2}}, \quad (1)$$

in which $T_{w1}$, $T_{w2}$ and s mean Order 1 DC blocking time constant of speed signal, Order 2 DC blocking time constant of speed signal and differential operator respectively.

The formula of parallel proportional differential PD correction is $$k_w \times (1+sT_7), \quad (2),$$

in which $K_w$, $T_7$ and s mean total proportional amplification factor of correction element, differentiating time constant and differential operator respectively.

When obtaining fluctuation signal of active power by using Order DC blocking element in Step 2, the formula is $$P_e \times \frac{sT_{w3}}{1+sT_{w3}} \times \frac{sT_{w4}}{1+sT_{w4}}, \quad (3)$$

in which $T_{w3}$, $T_{w4}$ and s mean Order 1 DC blocking time constant of active power, Order 2 DC blocking time constant of active power and differential operator respectively.

The formula of equivalent synthetic mechanical power in Step 3 is $$\omega \times \frac{sT_{w1}}{1+sT_{w1}} \times \frac{sT_{w2}}{1+sT_{w2}} \times (1+sT_7) \times K_w + \quad (4)$$
$$P_e \times \frac{sT_{w3}}{1+sT_{w3}} \times \frac{sT_{w4}}{1+sT_{w4}} \times K_{s3}$$

in which $K_{s3}$ means gain factor of DC blocking signal of active power.

When using Order 1 DC blocking element to obtain fluctuation signal of active power in Step 2, formula (5) is used instead of formula (3):

$$P_e \times \frac{sT_{w3}}{1+sT_{w3}} \quad (5)$$

The formula of equivalent synthetic mechanical power is the following formula (6) instead of formula (4).

$$\omega \times \frac{sT_{w1}}{1+sT_{w1}} \times \frac{sT_{w2}}{1+sT_{w2}} \times (1+sT_7) \times K_w + P_e \times \frac{sT_{w3}}{1+sT_{w3}} \times K_{s3} \quad (6)$$

As for DC blocking element of active power in Step 2, Order 1 or Order 2 is determined to use in real time according to field test data and requirement of phase compensation setting.

Moreover, the Step 6, after Order 1 lead and lag phase correction by actual fluctuation signal of active power, conduct Order 3 lead or lag compensation correction if necessary. When the phase characteristic of generator is in normal range, use Order 1 lead and lag compensation. However, if it is difficult for phase compensation under special circumstances, use Order 3 compensation element, and set it as lead or lag compensation according to actual situations, i.e. configured as backup correction means.

This invention has the following beneficial effects: (1) The power system stabilizer is able to be used to suppress low frequency oscillation of power system, provides lead and lag phase correction elements and has strong ability in phase correction and fast field setting. The field setting methods of current frequently-used power system stabilizers can be used for reference. (2) The method of direct introduction to lead and lag phase correction elements after DC blocking of active power enables that the actual fluctuation signal of active power is able to meet the requirement of phase compensation after Order 1 lead and lag correction, avoiding multi-order lead compensation caused by excessive phase lag of actual fluctuation signal of active power (Multi-order lead compensation may result in excessive gain in high band, thus limiting available gain in low band.) and greatly improving the ability of low-band oscillation suppression of power system stabilizer in low band. (3) After corrected by parallel proportional differential PD, the generator speed DC blocking signal blends with DC blocking fluctuation signal of active power to realize combination computation of equivalent synthetic mechanical power. After treated by notching filter, the generator speed DC blocking signal is in positive-negative offset with the original active power signal (treated by DC blocking element), thus realizing anti-reversal function for power system stabilizer and limiting reactive anti-reversal of the unit in the course of mechanical power adjustment of prime motor.

The invention retains the advantages of current frequently-used power system stabilizers like strong anti-reversal ability, clear physical conception, easy field setting and good phase compensation, it also, with the help of rational design of model structure, avoids gain limitation in low band due to excessive lead phase compensation, improves full-band gain, solves the problem of insufficient oscillation suppression in low band of current power system stabilizer, strengthen oscillation suppression and level of dynamic stability of super-large AC synchronous grids in low band.

DETAIL DESCRIPTION OF THE INVENTION

The invention is further illustrated in combination with all drawings of the instruction.

Figure 3:
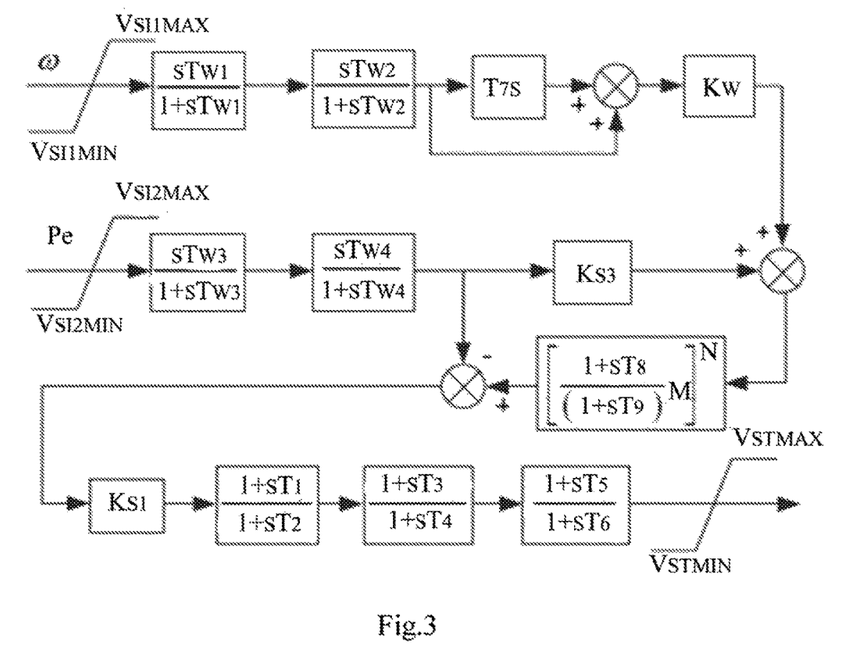
FIG. 3 is the model structure of power system stabilizer (PSS-NEW-B) of this invention.

The structure of power system stabilizer (PSS-NEW-B) model is shown in FIG. 3. Its working steps are as follows:

Step 1: Check generator speed single ω. Use two-order DC blocking link to get speed fluctuation signal and then correct it by parallel proportional differential PD.

Step 2: Check active power signal of generator $P_e$, and use Order 2 DC blocking link to get fluctuation signal of active power.

Step 3: After gain by gain factor $K_{s3}$, the fluctuation signal of active power in Step 2 by is added with speed fluctuation signal corrected by PD in Step 1 together to become equivalent synthetic mechanical power.

Step 4: Use notching filter to conduct lowpass filtering for equivalent synthetic mechanical power received in Step 3.

Step 5: Subtract fluctuation signal of active power in Step 2 from signal in Step 4 (by lowpass filtering in notching filter) to get actual fluctuation signal of active power.

Step 6: After gained by gain factor $K_{s1}$, the actual fluctuation signal of active power in Step 5 is taken as output of power system stabilizer after lead and lag correction by Order 1 respectively and upper & lower amplitude limiting. As backup means for phase correction in special circumstances, Order 3 lead-lag correction is set as lead or lag compensation according to specific situations when relevant requirements cannot be met after Order 2 compensation.

Figure 4:
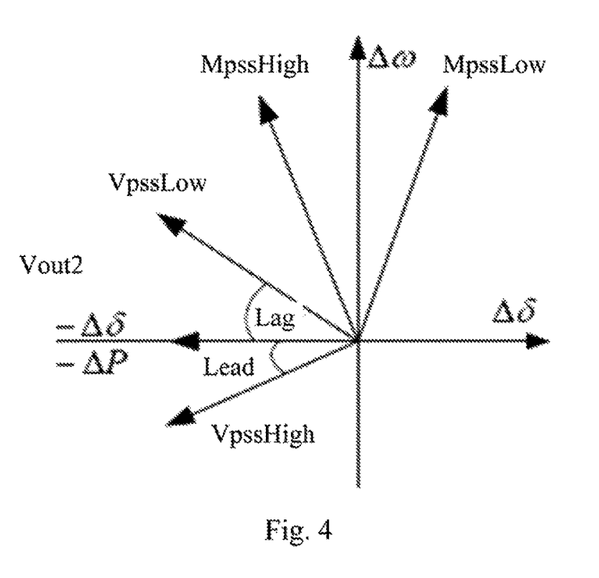
FIG. 4 is the phase relation between phase compensation and input signal of power system stabilizer (PSS-NEW-B). $V_{pss\ low}$, $V_{pss\ high}$, $M_{pss\ high}$, $M_{pss\ low}$ and Vout2 mean output in low frequency band, output in high frequency band, moment in high frequency band, moment in low frequency band and actual fluctuation signal of active power of PSS2B obtained by Step 5 of the invention respectively.

Shown as the phase relation in FIG. 4, when Vout 2 is close to the phase −ΔP, PSS-NEW-B typically uses lag compensation in low band and lead compensation in high band. The high-band phase of self-shunt excited or high initial excitation systems is relatively leading, or even needs no extra lead compensation provided by PSS-NEW-B, so the problem of one-way increase of high-band gain is solved.

Further illustrate this invention by taking a 1000 MW steam turbine generator unit as example and considering PSS2B power system stabilizer currently used by the unit as comparison objective.

This unit is of self-shunt excited, and main nominal parameters of generator are as follows:

Rated apparent power: 1120 MVA

Rated active power: 1008 MW

Rated terminal voltage: 27 kV

Rated exciting current: 5041 A

Direct-axis synchronous reactance (unsaturated value): 193.41%

Quadrature axis synchronous reactance (unsaturated value): 193.41%

Direct-axis open circuit time constant: 10.8 s

Adjustment setting of excitation system: −8%

1. Field Test of Uncompensated Lag Characteristic and Compensation & Setting of Phase Parameters of Generator Excitation System The unit during field test has active power, reactive power and terminal voltage of 888 MW, 101 MVar and 26.2 kV respectively. The field set PSS2B parameters are shown in Table 1.

TABLE 1

Setting Parameters of PSS2B Power System Stabilizer

| Parameter | Constant value | Parameter | Constant value | Parameter | Constant value |
|---|---|---|---|---|---|
| $T_{W1}$ | 5 | $T_8$ | 0.2 | $T_3$ | 0.22 |
| $T_{W2}$ | 5 | $T_9$ | 0.1 | $T_4$ | 0.02 |
| $T_{W3}$ | 5 | $K_{S1}$ | 8 | $T_{11}$ | 1 |
| $T_{W4}$ | 0 | N | 1 | $T_{12}$ | 1 |
| $K_{S2}$ | 0.6 | M | 5 | $V_{STMAX}$ | 0.05 |
| $T_7$ | 5 | $T_1$ | 0.2 | $V_{STMIN}$ | −0.05 |
| $K_{S3}$ | 1 | $T_2$ | 0.03 | $V_{SI2MAX}$ | 1 |
| $V_{SI1MAX}$ | 1 | $V_{SI1MIN}$ | −1 | $V_{SI2MIN}$ | −1 |

The parameters of PSS-NEW-B set according to field measured uncompensated lag characteristic of generator excitation system is shown in Table 3.

TABLE 2

Setting Parameters of PSS-NEW-B Power System Stabilizer

| Parameter | Constant value | Parameter | Constant value | Parameter | Constant value |
|---|---|---|---|---|---|
| $T_{W1}$ | 5 | $T_8$ | 0.2 | $T_3$ | 0.23 |
| $T_{W2}$ | 5 | $T_9$ | 0.1 | $T_4$ | 0.1 |
| $T_{W3}$ | 5 | $K_{S1}$ | 7 | $T_{11}$ | 1 |
| $T_{W4}$ | 0 | N | 1 | $T_{12}$ | 1 |
| $K_W$ | 1.67 | M | 5 | $U_{STMAX}$ | 0.1 |
| $T_7$ | 5 | $T_1$ | 0.3 | $U_{STMIN}$ | −0.1 |
| $K_{S3}$ | 1 | $T_2$ | 3 | $V_{SI2MAX}$ | 1 |
| $V_{SI1MAX}$ | 1 | $V_{SI1MIN}$ | −1 | $V_{SI2MIN}$ | −1 |

The phase compensation characteristic according to field measured uncompensated lag characteristic of generator excitation system as well as setting parameters of PSS2B and PSS-NEW-B power system stabilizers are shown in Table 3.

TABLE 3

Phase Compensation Results of PSS2B and PSS-NEW-B

| Frequency(Hz) | Uncompensated lag angle (°) | PSS2B compensation angle (°) | PSS-NEW-B compensation angle (°) | PSS2B after-compensation angle (°) | PSS-NEW-B after-compensation angle (°) |
|---|---|---|---|---|---|
| 0.08 | −34.90 | −35.90 | −23.07 | −70.80 | −57.97 |
| 0.16 | −44.55 | −47.67 | −37.55 | −92.22 | −82.10 |
| 0.23 | −53.16 | −46.14 | −37.24 | −99.29 | −90.40 |
| 0.47 | −72.41 | −30.65 | −23.86 | −103.06 | −96.27 |
| 0.63 | −77.19 | −20.96 | −16.26 | −98.15 | −93.45 |
| 0.86 | −83.66 | −10.23 | −9.44 | −93.90 | −93.10 |
| 1.02 | −93.54 | −5.39 | −6.87 | −98.93 | −100.41 |
| 1.25 | −104.98 | −0.78 | −5.19 | −105.77 | −110.17 |
| 1.41 | −115.49 | 0.93 | −4.94 | −114.55 | −120.43 |
| 1.56 | −123.01 | 1.83 | −5.14 | −121.18 | −128.15 |
| 1.80 | −106.26 | 2.02 | −6.05 | −104.24 | −112.31 |
| 2.03 | −108.75 | 1.18 | −7.32 | −107.57 | −116.07 |

Table 3 shows that in setting parameters and with the range of 0.2 Hz~2.0 Hz, the compensated lag characteristic angles of PSS2B and PSS-NEW-B are within specified −80°~−135°, and they are within specified −45°~−90°. The phase compensation result meets the requirements of relevant standards.

2. Setting of Total Amplification Factor $K_{s1}$ of Power System Stabilizer

Figure 5:
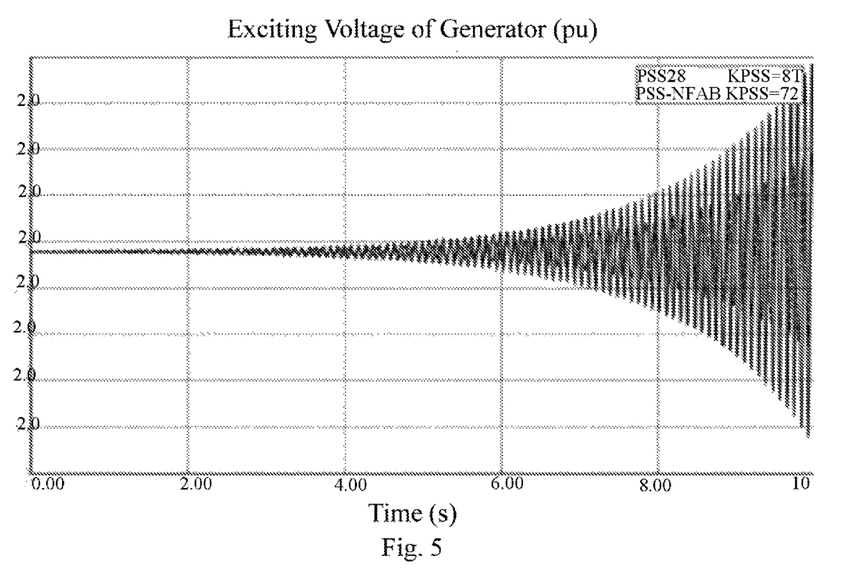
FIG. 5 is the waveform of simulation result of critical amplification factor for current PSS2B and PSS-NEW-B.

Use Order 6 model of above generator built on PSASP program platform. Apply custom function of model to build measured excitation system, parameters and various PSS models for simulation computation and analysis. Adjust the working conditions of unit to make it accord with those during field setting field. Gradually increase gain $K_{S1}$ of PSS2B and PSS-NEW-B respectively till diverging oscillation emerges in exciting voltage of generator. By this time, the $K_{S1}$ set value means respective critical amplification factor of two types of PSS. The critical amplification factor of PSS2B and PSS-NEW-B is 87 and 72 referring to simulation result in FIG. 5.

The field set amplification factor of PSS2B is 8. According to the principle of rounding of 1/10 critical amplification factor, the amplification factor of PSS-NEW-B is 7.

3. Comparison of Measurement and Simulation of Load Step Response

Figure 6:
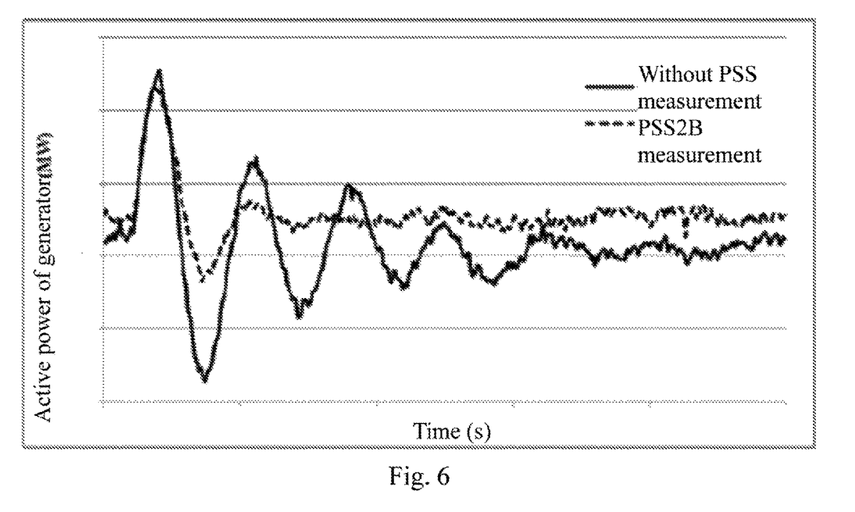
FIG. 6 is about 1% load voltage step response of generator when field measured PSS2B is in and out of service.

The working conditions of above 1000 MW unit are P=888 MW, Q=101 MVar, Ug=26.2 kV and Xc=−8%. FIG. 6 shows field measured 1% load voltage step response of generator when PSS2B power system stabilizer is in and out of service.

Figure 7:
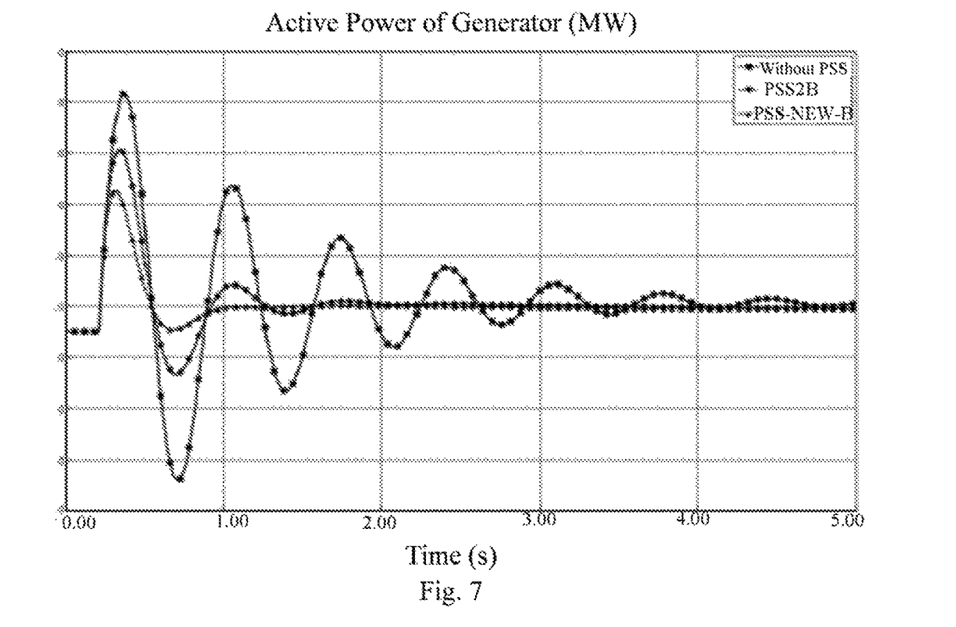
FIG. 7 is the simulation result of 1% load voltage step demand of generator for different situations when PSS is in and out of services.

Use PSASP simulation platform to simulate 1% load step demand of generator when PSS, PSS2B and PSS-NEW-B are not in service. See FIG. 7 for the results.

Table 4 shows oscillation quality parameters of measured and simulated active power.

TABLE 4

Oscillation Quality Parameters of Measured and Simulated 1% Load Voltage Step Response of Generator

| Items | In and out of service of PSS | Oscillation Frequency (Hz) | Damping Ratio D |
|---|---|---|---|
| Measurement | PSS is out of service. | 1.42 | 0.08 |
| | PSS2B is in service. | 1.44 | 0.29 |
| Simulation | PSS is out of service. | 1.42 | 0.09 |
| | PSS2B is in service. | 1.38 | 0.28 |
| | PSS-NEW-B is in service. | 1.38 | >>0.5 |

Table 4 shows that the simulated and measured results are the same when PSS2B is in and out of service, proving that the simulation result is authentic. Judging from load voltage step response waveform and response quality parameters calculated accordingly, the oscillation of active power quiets down quickly after PSS-NEW-B is in service, and additional damping provided is far bigger than that of PSS2B, showing that PSS-NEW-B has better ability in low-band oscillation suppression than PSS2B.

4. Simulation Comparison of Recovery Ability after Three-Phase Short Circuit

Use PSASP simulation platform. Set three-phase short circuit fault at near-end of 500 kV outlet of power station. Simulate relay protection action after 0.1 s. Cut off fault lines, and check recovery waveform of active power afterwards. See FIG. 8 for details.

Figure 8:
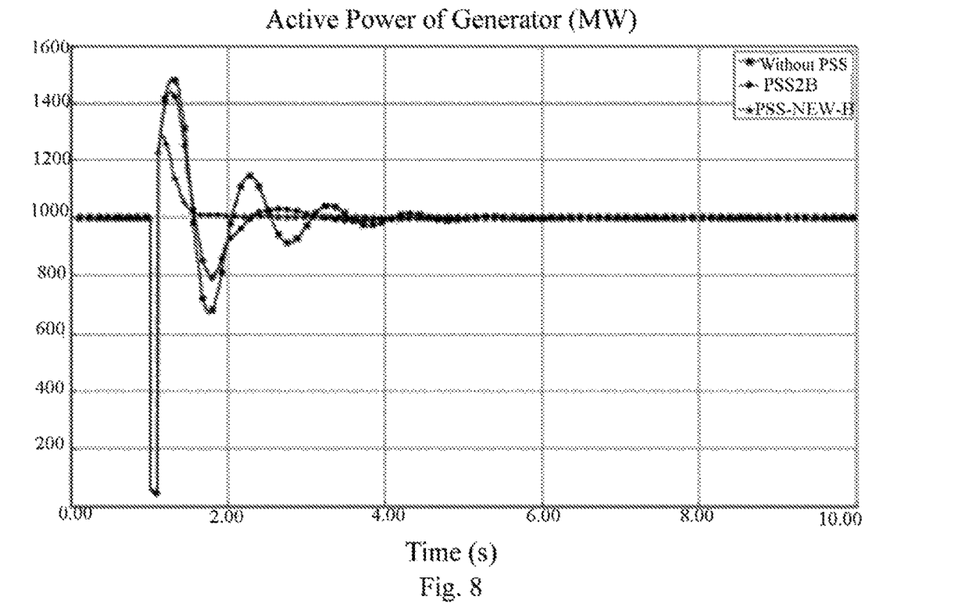
FIG. 8 is cutting-off response simulation of three-phase short circuit 0.1 s line at near-end of outlet of power station for different situations when PSS is in and out of services.

Judging from FIG. 8, the sequence of recovery rate of active power is PSS-NEW-B, PSS2B and PSS out of service. However, if PSS-NEW-B is in service, the oscillation of active power after fault line is cut off quiets down quickly, and the effect of power oscillation suppression is good, showing that PSS-NEW-B power system stabilizer is able to provide better ability in power oscillation suppression than PSS2B, thus good for dynamic stability of power system.

What is claimed is:

1. A method of suppressing low frequency active power oscillation with minimum reactive power variation for super-large power grids comprising the steps of:
   step 1: check generator speed signal ω, use two-order DC blocking element to get speed fluctuation signal, which is corrected by parallel proportional differential PD to get corrected speed fluctuation signal;
   step 2: check active power signal of generator $P_e$, and use 1st order or 2nd order DC blocking element to get fluctuation signal of active power, which is gained by gain factor $K_{s3}$ to get gained fluctuation signal of active power;
   step 3: the gained fluctuation signal of active power in the step 2 is added with the corrected speed fluctuation signal in the step 1 together to become an equivalent synthetic mechanical power for equaling stationary mechanical power from prime mover;
   step 4: use notching filter to conduct lowpass filtering for the equivalent synthetic mechanical power gotten in the step 3 to get a lowpass filtered signal;
   step 5: subtract the fluctuation signal of active power in the step 2 from the lowpass filtered signal in the step 4 to get an actual fluctuation signal of active power;
   step 6: the actual fluctuation signal of active power in the step 5 is gained by gain factor $K_{s1}$, then is amended by 1st order lead or lag phase correction respectively and then is limited by upper limit and lower limit to get a final voltage signal suppressing fluctuation signal of active power, which is input to the super-large power grids by a power system stabilizer.

2. The method according to claims 1, wherein a formula of the speed fluctuation signal in the step 1 is $$\omega \times \frac{sT_{w1}}{1+sT_{w1}} \times \frac{sT_{w2}}{1+sT_{w2}},$$

in which $T_{w1}$, $T_{w2}$ and s mean 1st order DC blocking time constant of speed signal, $2^{nd}$ order DC blocking time constant of speed signal and differential operator respectively;
a formula of the parallel proportional differential PD correction is
$K_w \times (1+sT_7)$,
in which $K_w$, $T_7$ and s mean total proportional amplification factor of correction element, differentiating time constant and differential operator respectively.

3. The method according to claims 2, wherein when obtaining the fluctuation signal of active power in the step 2, a formula is $$P_e \times \frac{sT_{w3}}{1+sT_{w3}} \times \frac{sT_{w4}}{1+sT_{w4}},$$

in which $T_{w3}$, $T_{w4}$ and s mean 1st order DC blocking time constant of active power, 2nd order DC blocking time constant of active power and differential operator respectively.

4. The method according to claims 3, wherein a formula of the equivalent synthetic mechanical power in the step 3 is $$\omega \times \frac{sT_{w1}}{1+sT_{w1}} \times \frac{sT_{w2}}{1+sT_{w2}} \times (1+sT_7) \times K_w + P_e \times \frac{sT_{w3}}{1+sT_{w3}} \times \frac{sT_{w4}}{1+sT_{w4}} \times K_{s3},$$

in which $K_{s3}$ means gain factor of active power.

5. The method according to claims 2, wherein when using the 1st order DC blocking element to obtain fluctuation signal of active power in the step 2, a formula is $$P_e \times \frac{sT_{w3}}{1+sT_{w3}},$$

in which $T_{w3}$ and s mean 1st order blocking time constant of active power and differential operator respectively;
a formula of the equivalent synthetic mechanical power is $$\omega \times \frac{sT_{w1}}{1+sT_{w1}} \times \frac{sT_{w2}}{1+sT_{w2}} \times (1+sT_7) \times K_w + P_e \times \frac{sT_{w3}}{1+sT_{w3}} \times K_{s3},$$

in which $K_{s3}$ means gain factor of active power.

6. The method according to claims 1, wherein after the 1st order lead or lag phase correction element for actual fluctuation signal of active power in the step 6, conduct 2nd order and 3rd order lead or lag compensation element correction if necessary.

* * * * *